United States Patent [19]

Ross et al.

[11] Patent Number: 4,898,743
[45] Date of Patent: Feb. 6, 1990

[54] METHOD OF COOKING LOBSTER

[76] Inventors: Richard E. Ross; Shelley D. Ross, both of 5240 Westside Rd., Redding, Calif. 96001

[21] Appl. No.: 239,529

[22] Filed: Aug. 31, 1988

[51] Int. Cl.⁴ .................................................. A23L 1/33
[52] U.S. Cl. .................................... 426/523; 426/113; 426/129
[58] Field of Search ............... 426/523, 643, 479, 302, 426/393, 129, 113; 99/646 C, DIG. 15

[56] References Cited

U.S. PATENT DOCUMENTS 3,780,196  12/1973  Domecki .............................. 426/393

Primary Examiner—George Yeung
Attorney, Agent, or Firm—Leonard D. Schappert

[57] ABSTRACT

A method of cooking lobster is provided including cutting the shell of the lobster, removing and cleaning the meat of the lobster and positioning the meat atop the shell, placing the shell and meat inside a lobster pan or boat having upwardly extending sides and heating the lobster pan or boat and the lobster meat until it is cooked.

3 Claims, 1 Drawing Sheet

METHOD OF COOKING LOBSTER

BACKGROUND OF THE INVENTION

1. Field of the Invention

The present invention relates generally to methods of cooking animal flesh, and more particularly to a method of cooking lobster in such a way that the lobster emerging from the cooking process is extremely tender and succulent.

2. Description of the Prior Art

Past Inventors have directed their efforts toward cooking meats on barbecue grills, broil bases which are structured so that they are contoured to fit a particular kind of fish and smoking and cooking apparatus that totally enclose meat or the like while it is being cooked, and further toward the use of a flat rigid pad having a central core of heat insulating material to keep the meat being cooked from being burned on the bottom. None of the prior art of which applicants are aware has taught a method of cooking lobster having the tender, succulent quality and excellent taste as is developed by the present invention.

SUMMARY OF THE INVENTION

The present invention consists of a method of cooking lobster which includes cutting the shell and removing the lobster to position the meat of the lobster on top of the shell. Additionally, the method includes positioning the lobster, including the shell, into a lobster pan or boat which is shaped so that the sides of the pan substantially conform to the shape of a lobster shell. The sides of the pan are high enough so that, when the lobster is being heated, the pan heats and the sides of the pan reradiate heat toward the meat of the lobster. Because the lobster meat is positioned above the surface of the bottom of the pan, no burning occurs, but radiant heat from all of the sides of the pan, as well as from any other radiant heating source, results in an even, smooth cooking of the meat of the lobster and produces an extremely tender, succulent lobster.

One of the objects of the present invention is to provide a method of cooking lobster which results in a much more tender, succulent meat.

Another object of the present invention is to provide a method of cooking lobster which is readily adapted to use by restaurants.

A further object of the present invention is to provide a method of cooking lobster which is readily adapted to precooking of the lobsters and freezing so that they can be easily cooked at the point of final consumption, thereby increasing the marketability of lobsters cooked by this method.

Another object of the present invention is to provide a method of cooking lobster which provides for a smooth, even cooking of the lobster without burning the lobster.

The foregoing objects, as well as other objects and benefits of the present invention, are made more apparent by the descriptions and claims which follow.

DESCRIPTION OF THE PREFERRED EMBODIMENT

Figure 1:
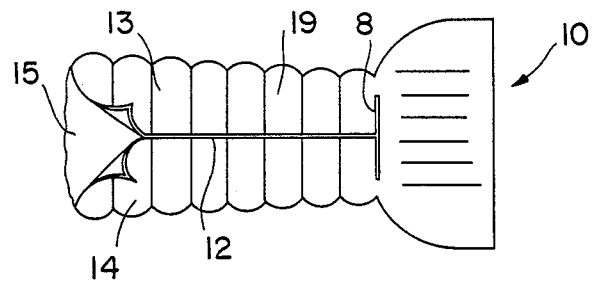
FIG. 1 is a top view of a lobster being readied for cooking by the present method.
Figure 2:
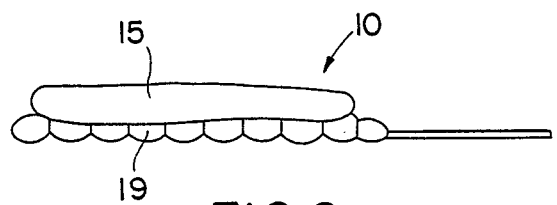
FIG. 2 is a side view of the lobster after it has been prepared to begin cooking.

FIG. 1 of the drawings is a perspective view of a lobster which is being prepared for cooking by the method of the present invention. Notice that the lobster shell 19 of lobster 10 is cut along line 12 from the end opposite the tail 11 toward point B near tail 11 a sufficient distance to allow the lobster meat 15 of lobster 10 to be pulled out from beneath sides 13 and 14 of lobster shell 19. After lobster shell 19 has been cut along line 12, sides 13 and 14 are pulled back and the lobster meat 15 is separated from the lobster shell 19 both at the sides and at the bottom of the lobster shell 19. The lobster meat 15 is then removed from lobster shell 19. After removal of the lobster meat 15 from lobster shell 19, the vein which appears on the top side of the lobster meat 15 is also removed. Once the lobster meat 15 has been removed from lobster shell 19, lobster meat 15 is washed. After lobster meat 15 has been washed, it is placed on top of lobster shell 19 as shown in FIG. 2 of the drawings with the bottom side of lobster meat 15 upward. A small portion of lobster meat 15 which contacts lobster shell 19 is tucked between sides 13 and 14 of lobster shell 19. Lobster meat 15 of lobster 10 is held in position on top of lobster shell 19 as shown in FIG. 2.

Figure 3:
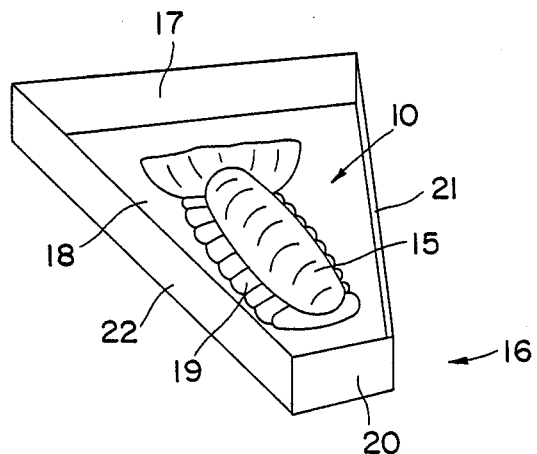
FIG. 3 is a perspective view of the lobster of FIG. 2 in position in a lobster boat particularly designed to facilitate cooking the lobster by the method taught herein.

As is shown in FIG. 3, after the lobster meat 15 has been removed from lobster shell 19 and placed in position atop lobster shell 19, as shown in FIG. 2, the combination of lobster shell 19 and lobster meat 15 is positioned in lobster boat 16 with the lobster shell 19 positioned down toward the bottom 18 of lobster boat 16 and with the lobster shell 19 positioned down toward the bottom 18 of lobster boat 16 and with lobster meat 15 exposed. Notice that the lobster boat 16 is shaped so that back wall 17 is longer than front wall 20 so that, as a lobster shell 19 and lobster meat 15 are placed inside lobster boat 16, the tail 11 is positioned toward back wall 17 of lobster boat 16. Because of the shortness of front wall 20 with respect to back wall 17, side walls 21 and 22 of lobster boat 16 substantially follow the shape of lobster shell 19. The height of walls 17, 20, 21 and 22 of lobster boat 16 is chosen so that they extend approximately the height of lobster shell 19, but might extend slightly higher. Walls 17, 20, 21 and 22 extend upward from the bottom 18 of lobster boat 16. While the angle of walls 17, 20, 21 and 22 with respect to bottom 18 is not specified here, the critical factor is that the walls 17, 20, 21 and 22 extend upward from the bottom 18 of lobster boat 16. As a result of the placement of lobster meat 15 on top of lobster shell 19 of lobster 10 and the orientation and proximity of walls 17, 20, 21 and 22 of lobster boat 16 with respect to lobster meat 15 of lobster 10, when lobster boat 16 is positioned on a grill or other heat source with heat coming from below, while the bottom 18 of lobster boat 16 heats, the walls 17, 20, 21 and 22 also heat, reradiating the heat in a fairly even manner about the mass of lobster meat 15. Thus, lobster meat 15 of lobster 10 does not brown or burn so long as the heat being applied is properly controlled. During the cooking process, lobster meat 15 may be basted with butter to develop flavor. As a result of the reradiation of heat from walls 17, 20, 21 and 22, as well as the placement of lobster meat 15 atop lobster shell 19, the lobster meat 15 turns substantially solidly white or pale, at which point it is removed from the heated area. At this point it may be removed from lobster boat 16 and basted with butter and sprinkled with paprika or other spices or garnishes as desired.

While the foregoing description of the invention has shown a preferred embodiment using specific terms, such description is presented for illustrative purposes only. It is applicants' intention that changes and variations may be made without departure from the spirit or scope of the following claims, and this disclosure is not intended to limit applicants' protection in any way.

We claim:

1. A method of cooking lobster, comprising:
   cutting a lobster shell having lobster meat therein to facilitate removal of said lobster meat therefrom;
   removing said lobster meat from said lobster shell;
   positioning said lobster meat atop said lobster shell;
   placing said lobster shell and said lobster meat into a cooking pan having a bottom and sides extending upward from said bottom, said bottom and sides being shaped, positioned and oriented such that when said lobster shell is positioned against said bottom of said cooking pan and said lobster meat is positioned atop said lobster shell, said lobster meat is positioned in close proximity to all of said sides of said cooking pan, and
   heating said cooking pan to cause reradiation of heat from said sides of said cooking pan toward said lobster meat whereby said lobster meat is substantially evenly cooked.

2. The invention of claim 1, wherein a vein on said lobster meat is removed and said lobster meat is washed after being removed from said lobster hell but before being positioned atop said lobster shell.

3. The invention of claim 2, wherein said meat is basted with butter while said cooking pan is hot.

* * * * *